United States Patent [19]

Haynes

[11] 3,961,730

[45] June 8, 1976

[54] LIQUID DISPENSING APPARATUS

[76] Inventor: Robert W. Haynes, c/o Haynes Chemical Co., East Grand Forks, Minn. 56721

[22] Filed: Sept. 25, 1974

[21] Appl. No.: 509,344

[52] U.S. Cl. .............................................. 222/231
[51] Int. Cl.² ......................................... G01F 13/00
[58] Field of Search .............. 198/64; 222/227–231, 222/48, 410

[56] References Cited
UNITED STATES PATENTS

| | | | |
|---|---|---|---|
| 1,018,924 | 2/1912 | Patnaude | 62/397 |
| 1,996,044 | 3/1935 | Green | 222/231 |
| 2,507,820 | 5/1950 | Shafer | 198/64 |
| 3,642,171 | 2/1972 | Ernst | 222/133 X |
| 3,773,220 | 11/1973 | Morgan et al. | 272/231 X |

Primary Examiner—Allen N. Knowles
Assistant Examiner—Norman L. Stack, Jr.
Attorney, Agent, or Firm—Cushman, Darby & Cushman

[57] ABSTRACT

Liquid dispensing apparatus especially adapted for dispensing liquid insecticide and the like to material being transported by a conveying device. A valve providing communication between a liquid reservoir and the conveying device is normally biased closed. Operation of the conveying device cocks a tripping device, which when released strikes a portion of the valve causing temporary opening thereof, and dispensing of a predetermined amount of liquid to the material. The amount of liquid dispensed during each temporary opening of the valve is controlled by adjustment of an arcuate member that controls the amount that the valve may be opened.

7 Claims, 2 Drawing Figures

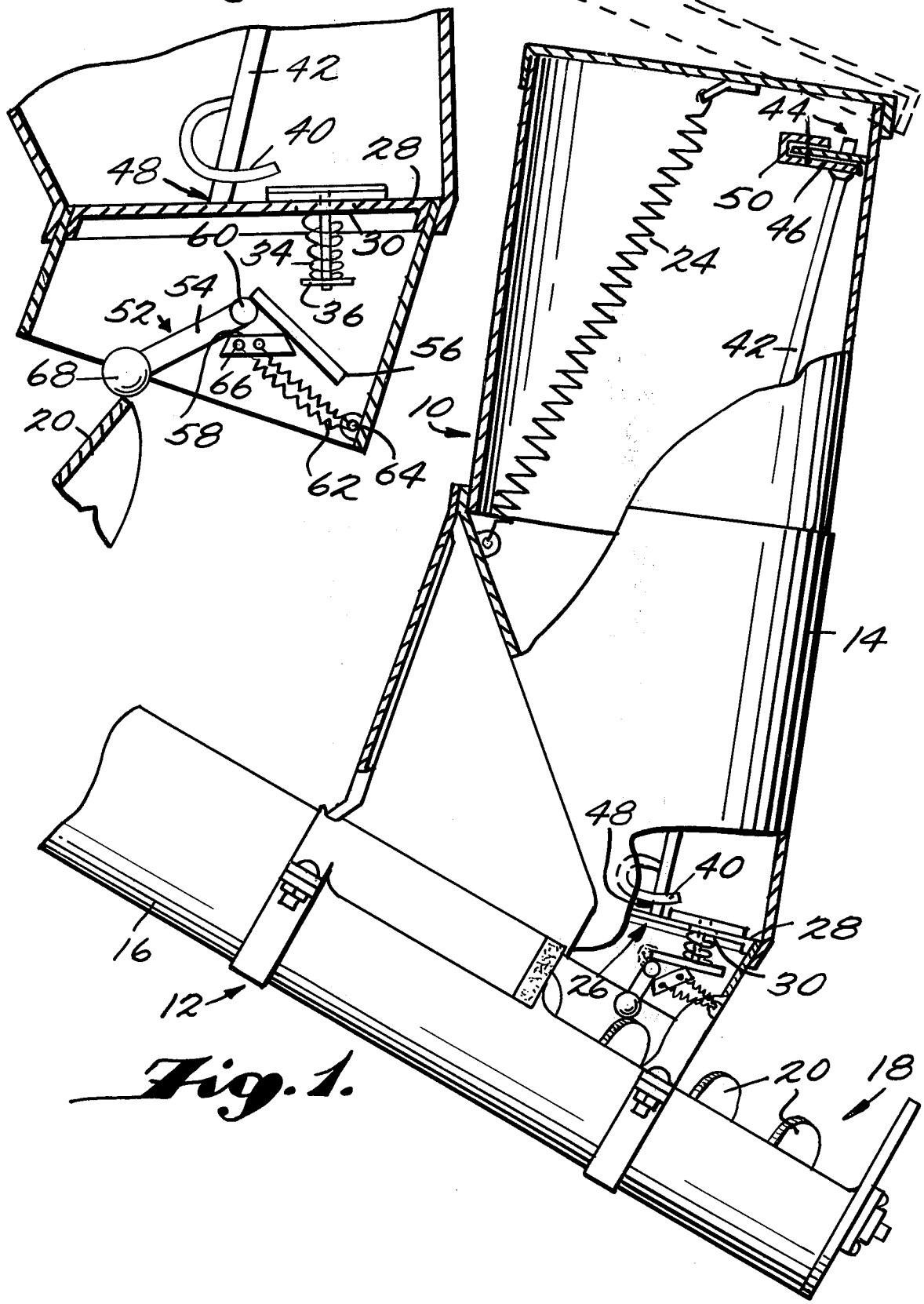

LIQUID DISPENSING APPARATUS

BACKGROUND AND SUMMARY OF THE INVENTION

The general field of the invention is the metering of liquid for treating material, and the specific field of the invention is the metering of liquid insecticide and the like for treating seed or the like being transported and/or mixed by conveying means. It is often necessary for farmers to treat seed for storage or before planting so that it will be resistant to insects, fungus, and a variety of other maladies. In the past, while it has been common to provide means for treating seed conveyed by an auger or the like with powdered insecticide, the treatment with liquid insecticide has not been entirely successful, problems of proper adjustment of the amount of liquid dispensed, problems of dispensing in an auger environment, and problems of liquid flow after auger movement has stopped being common.

Typical prior art devices for treating seed or the like with powdered material are shown in U.S. Pat. Nos. 3,773,220 and 2,507,820. While these devices are successful in properly dispensing powdered material, they are not adaptable for use with liquid insecticide or the like since liquid flow therethrough would be constant, and would generally result in improper dosage of insecticide with consequent adverse effects or waste. Devices in the general art of liquid dispensing, such as shown in U.S. Pat. No. 1,018,924, are not adaptable to function properly in the seed and grain treating environment, means responsive to conveyor movement and means for facilitating positive dispensing of the proper amount of liquid not being provided.

According to the teachings of the present invention, apparatus is provided for metering out the exact amount of liquid desired for treating seed and the like, which liquid is metered out in response to auger or other seed conveying means position, but which will prevent liquid leakage into the auger when the auger is stopped no matter what position it assumes when stopped. Such apparatus preferably comprises a valve normally biased into closed position at an opening from a liquid reservoir to a seed-conveying means. A tripping device which normally does not act on the valve to open it is cocked by engagement of a portion thereof with a portion of the conveying means during a cycle of operation thereof. After cocking, the tripping device is released, and a portion thereof abuts the valve, temporarily opening it and allowing a flow of liquid from the reservoir to the seed or the like within conveying means. The amount the valve is opened — and thus the amount of liquid that is dispensed during each opening of the valve — may be precisely determined by adjusting a valve limiting means for limiting the degree of opening thereof.

It is the primary object of the present invention to provide means for effectively dispensing a desired amount of liquid to material carried by a conveying means, in response to the movement of said conveying means. This and other objects of the invention will become clear from an inspection of the detailed description of the invention and the appended claims.

BRIEF DESCRIPTION OF THE DRAWINGS

FIG. 1 is a side view partly in section of liquid-dispensing apparatus according to the present invention, showing the valve thereof in temporary open-liquid dispensing position;

FIG. 2 is a detail view partly in section of the valve and operating means therefor showing the valve in its normal closed position.

DETAILED DESCRIPTION OF THE INVENTION

The invention relates to apparatus for treating with a liquid materials transported by a conveying means. In particular, it relates to apparatus for treating seed, grain, or the like with a liquid insecticide, fungicide, numaticide, herbicide, or the like. The liquid-dispensing means is shown generally at 10 in FIG. 1, having a body portion 14 thereof connected via any suitable fastening means 12 to a conveying tube 16 of an auger 18 or the like. The auger 18 is shown in the drawings as having conventional flights 20 associated therewith, and is adapted to transport seed or the like upwardly through the tube 16. While an auger 18 is shown in the drawings, it is to be understood, that other suitable conveying means, such as a paddle conveyor or the like, may also be utilized.

The liquid-dispensing body portion 14 is adapted to receive a suitable treating liquid therein. A removable cover 22 may be provided for the body 14, and the cover may be biased by a spring 24 into its closed position to prevent contaminants from entering the interior of the body 14. At the lower end of the body 14 is a bottom plate 26 for preventing communication between the interior of the body 14 and the auger 18. The plate 26 has a top surface 28 thereof, and an opening 30 therein. The opening 30 is normally closed (see FIG. 2) by abutment of a valve 32 with the top surface 28. The valve 32 has a stem portion 34 thereof extending through the opening 30 and terminated by a flange 36, and a spring 38 or the like is disposed between the plate 26 and the flange 36 for normally biasing the valve 32 into engagement with the surface 28.

Movement of the valve 32 in opposition to the bias of the spring 38 away from the surface 28 allows the entrance of liquid from the body 14 into the auger 18 for treatment of the material conveyed by the auger. The amount of flow of liquid through the opening 30 during each movement of the valve 32 away from the surface 28 is controlled by the arcuate member 40 or the like, which limits the extend of upward movement of the valve 32. The arcuate member 40 is adjusted by rotating it about shaft 42 to which it is attached. The shaft 42 is pivoted at 44 to plate 46 near the top of the body 14, and at 48 to plate 26. Rotation of the shaft 42 is accomplished by rotation of handle 50 rigidly attached thereto. Preferably the handle 50 is located at the top of the body 14 for ease of access. Indicia and/or detent means may be provided for the handle 50 to facilitate positive positioning of the member 40 in a desired relationship with respect to the valve 32 to accurately determine the amount of liquid to be metered to the material carried by the auger 18 during each upward movement of the valve 32.

Opening of the valve 32 is controlled by a tripping device, shown generally at 52 in the drawings. The tripping device 52 may be of any suitable construction for temporarily forcibly bringing a member into operative engagement with the stem 34 of valve 32 in response to the movement of the auger 18 to temporarily open the valve 32 with snap-action. As shown in the drawings, the tripping device 52 comprises an arm 54 responsive to auger 18 movement, and arm 56 for engagement with the valve stem 34, and a connecting portion 58 connecting the arms 54 and 56. The arms are pivoted about a shaft 60 received by opposed walls of the body portion 14. A spring 62 or the like is operatively connected to the tripping device 52 by attachment at 66 to portion 58, and is connected at 64 to the body portion 14. An auger-flight engaging portion 68 is rigidly attached to arm 54. The spring constant of the spring 62 may be chosen so that in the rest position thereof, even though the arm 56 abuts stem 34, it does not provide enough force to overcome the inertia and bias of spring 38; or preferably, the location of the shaft 60 and spring attachments 64 and 66 are chosen so that in the normal position of device 52 the arm 56 barely makes contact with the bottom of stem 34.

The operation of the exemplary device according to the invention is as follows: Seed or other material that it is desired to treat is placed in auger 18 and conveyed by auger flights 20 through the conveying tube 16. The treating liquid or liquids are placed in body portion 14. The dispensing adjustment means 40 is adjusted by rotation of handle 50 to the desired position which position is dependent upon the volume of material to be treated, the speed of the auger 18, and the type and desired dosage of the treating liquid. Operation of the auger 18 results in an upward translation of auger flights 20 thereof. During each rotation of the auger 18 a flight portion 20 thereof abuts the portion 68 attached to arm 54 of tripping device 52, and the device 52 is rotated about shaft 60 clockwise, resulting in the tensioning of spring 62 and the movement of arm 56 away from stem 34 of valve 32 to the position shown in FIG. 2. Slight additional movement of the flight 20 from the position shown in FIG. 2 results in the portion 68 of device 52 clearing the flight portion 20, and the device 52 is moved rapidly in the counter-clockwise direction about the shaft 60 under the force of spring 62. This movement causes arm 56 to forcibly engage stem 34 of valve 32, causing valve 32 to be moved away from the surface 28 — to the FIG. 1 position — to allow liquid to flow through the opening 30. The upward movement of the valve 32, and thus the amount of liquid metered in, is determined by the position of the member 40. The valve 32 will only remain open temporarily, and will close under the force of spring 38 as soon as the force supplied by arm 56 is diminished. In this way, permanent communication of the liquid within body 14 and the auger 18 is prevented no matter what the position of the auger flights 20 are when the auger is shut down. Proper mixing of the liquid and conveyed material occurs during subsequent conveyance of the material. Of course the cocking of the tripping device and the temporary opening of the valve 32 will be repeated for each rotation of the auger 18.

It will thus be seen that apparatus has been herein disclosed that provides for even metering of a liquid insecticide or the like for treatment of seed or the like in conveying means. Permanent communication between the liquid reservoir and the auger is prevented no matter what position the auger is stopped in, and precise adjustment of the amount of liquid delivered is facilitated.

While the invention has been herein shown in what is presently conceived to be the most practical and preferred embodiment, it will be apparent to one of ordinary skill in the art that many modifications may be made thereof within the scope of the invention, which scope is not to be limited except by the appended claims.

What is claimed is:
1. Liquid-dispensing apparatus comprising
   a. conveying means for conveying material to be treated, said conveying means including engagement means,
   b. a liquid reservoir adapted to hold material-treating liquid,
   c. valve means biased to a closed position for preventing delivery of liquid from said reservoir to material being conveyed by said conveying means when closed, and alternatively for allowing delivery of an amount of liquid from said reservoir to said material when opened,
   d. tripping means for temporarily opening said valve means with a snap-action against its closed-position bias so that no movement of the valve member takes place in direct response to movement of said conveying means but only in response to movement by said tripping means after release thereof by said conveying means engagement means, said tripping means including a member for cooperation with said engagement means of said conveying means, and
   e. means for positioning said tripping means to temporarily open said valve means once during each predetermined degree of movement of said conveying means.
2. Apparatus as recited in claim 1 further comprising means for adjusting the amount of liquid that will be dispensed by said valve means during each temporary opening thereof.
3. Apparatus as recited in claim 2 wherein said adjusting means comprises means for limiting the amount of travel of said valve means from its normally closed position.
4. Apparatus as recited in claim 3 wherein said valve travel limiting means comprises an arcuate abutment member, and means for controlling the portion of said arcuate abutment member above said valve means by rotation thereof.
5. Apparatus as recited in claim 1 wherein said tripping means positioning means includes a shaft about which said tripping means may rotate, and
   wherein said tripping means includes a device having a first portion thereof comprising said member for cooperation with said engagement means of said conveying means, and a second portion thereof for cooperation with said valve means for engagement thereof, and biasing means for imparting a striking force to said second portion to open said valve means against its closed-position bias.
6. Apparatus as recited in claim 5 wherein said biasing means comprises a spring attached to said reservoir and to said tripping device.
7. Apparatus as recited in claim 1 wherein said conveying means comprises an auger.

* * * * *